United States Patent
Sakaue et al.

(10) Patent No.: US 6,339,312 B2
(45) Date of Patent: Jan. 15, 2002

(54) CHARGER

(75) Inventors: Masaaki Sakaue, Hikone; Toshiharu Ohashi, Shiga; Kazuhiro Suzuki, Hikone, all of (JP)

(73) Assignee: Masushita Electric Works, Ltd. (JP)

( * ) Notice: Subject to any disclaimer, the term of this patent is extended or adjusted under 35 U.S.C. 154(b) by 0 days.

(21) Appl. No.: 09/772,868

(22) Filed: Jan. 31, 2001

Related U.S. Application Data

(62) Division of application No. 09/199,375, filed on Nov. 25, 1998, now Pat. No. 6,218,807.

(30) Foreign Application Priority Data

Nov. 25, 1997 (JP) .............................................. 9-322621
Mar. 18, 1998 (JP) ............................................ 10-69122

(51) Int. Cl.$^7$ ................................................ H02J 7/00
(52) U.S. Cl. ................................................ 320/107
(58) Field of Search ................................. 320/104, 107, 320/108, 109, 110; 429/82, 97, 99

(56) References Cited

U.S. PATENT DOCUMENTS

| 4,313,080 A | 1/1982 | Park ........................... 320/123 |
| 5,015,545 A | 5/1991 | Brooks ........................ 429/99 |
| 5,204,609 A | 4/1993 | Alisauski ..................... 320/107 |
| 5,229,702 A | 7/1993 | Boehling et al. ........... 320/127 |
| 5,461,299 A | 10/1995 | Bruni ......................... 320/108 |
| 5,583,418 A | 12/1996 | Honda et al. ............... 320/109 |
| 5,680,030 A | 10/1997 | Kadouchi et al. ........... 320/134 |
| 5,721,064 A | 2/1998 | Pedicini et al. ............. 429/97 |
| 6,025,086 A | * 11/1998 | Ching ......................... 429/82 |
| 5,856,037 A | 1/1999 | Casale et al. ................ 429/82 |
| 5,883,491 A | 3/1999 | Silverman ................... 320/104 |
| 5,991,665 A | 11/1999 | Wang et al. ................. 320/108 |

FOREIGN PATENT DOCUMENTS

| JP | 5-37634 | 9/1993 |
| JP | 5-84023 | 11/1993 |
| JP | 6-54209 | 7/1994 |

* cited by examiner

Primary Examiner—Peter S. Wong
Assistant Examiner—Pia Tibbits
(74) Attorney, Agent, or Firm—Burns, Doane, Swecker & Mathis, LLP

(57) ABSTRACT

A charger includes a battery pack receiving therein a plurality of batteries and having a projection provided with a contacting terminal, and a charger section having a mounting hole provided with a charging terminal, the battery pack being set on the charger section with the projection mounted into the mounting hole of the charger section for charging the batteries. The battery pack has vent ports through a wall on the side having the projection, while the charger section has blast ports at positions opposing the vent ports and a blower disposed to be on a side of the mounting hole and below the blast ports, for blowing air from the blower, through the vent ports into the interior of the battery pack, for elevating blow rate to the battery pack, battery cooling and gas discharge out of the battery pack.

7 Claims, 11 Drawing Sheets

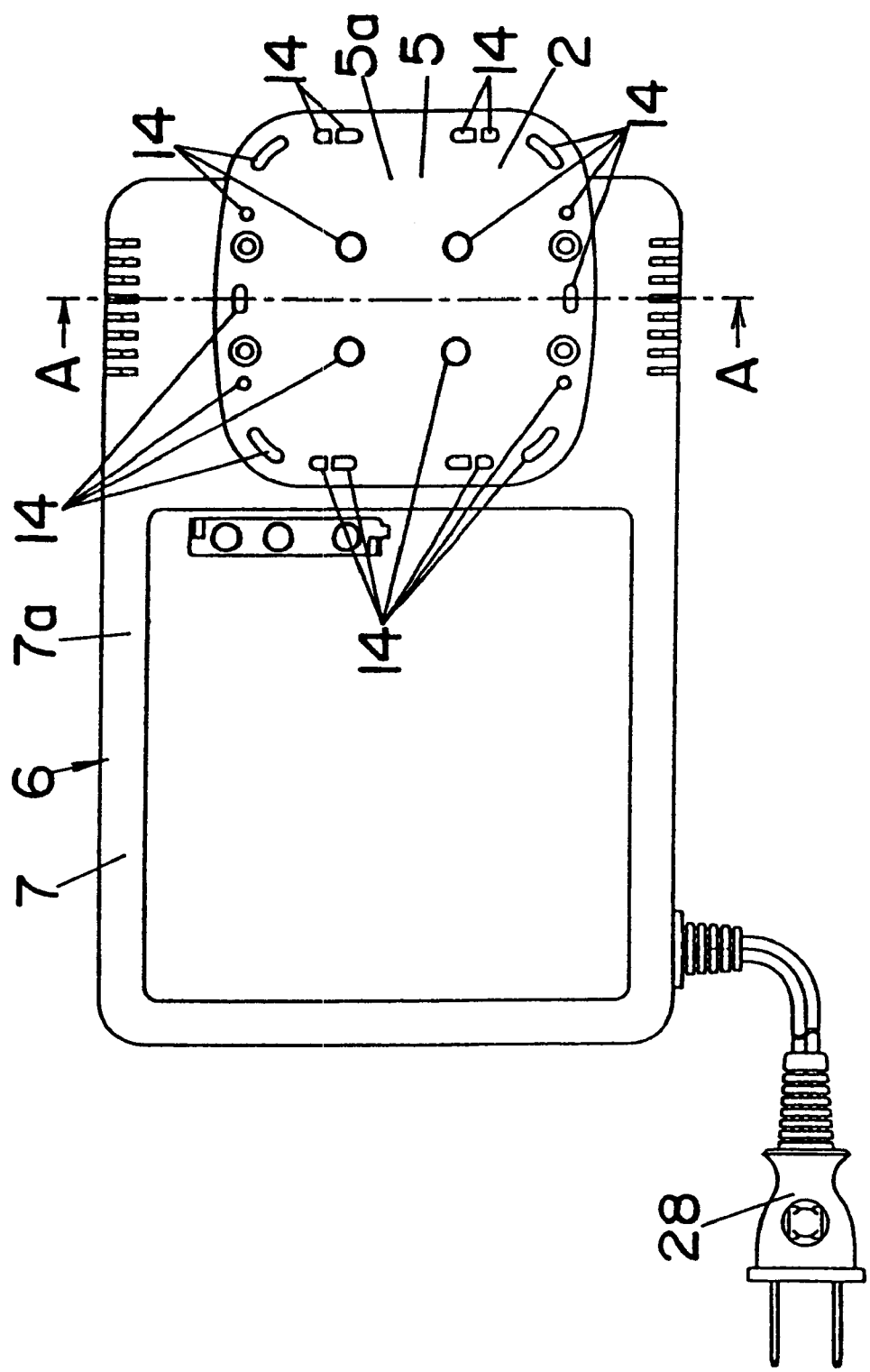

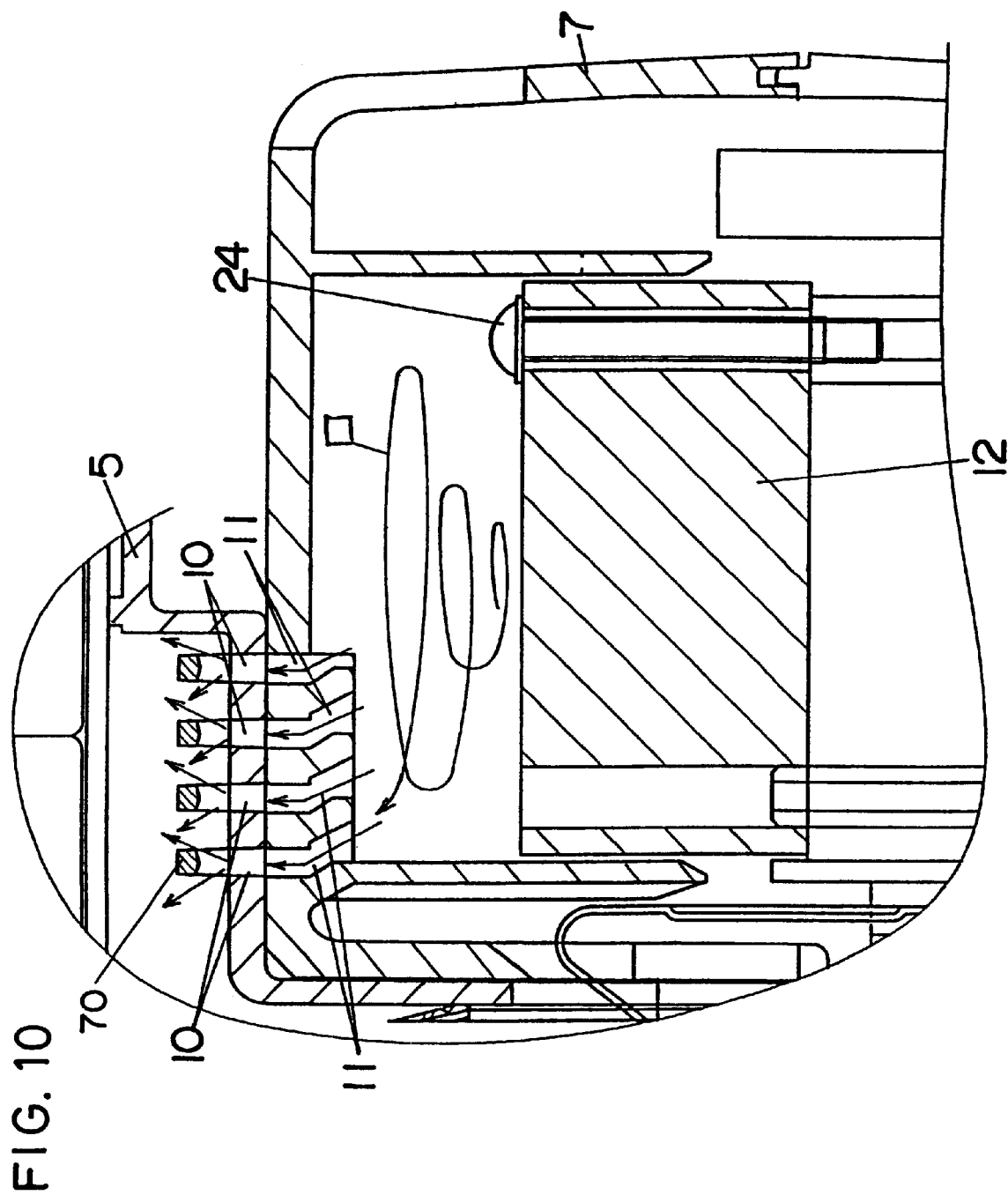

CHARGER

RELATED INVENTIONS

This is a divisional of application Ser. No. 09/199,375 filed on Nov. 25, 1998 issued as U.S. Pat. No. 6,218,807 on Apr. 17, 2001, and relates to an invention disclosed in concurrently filed application U.S. Ser. No. 09/772,860.

BACKGROUND OF THE INVENTION

This invention relates to a charger and, more particularly, to a battery charger for charging a battery pack for use in various electric machines, equipments, tools and so on.

DESCRIPTION OF RELATED ART

For storage battery used in rechargeable battery-powered machines, equipments, tools and so on, a nickel-cadmium or a nickel-hydrogen battery has been widely used recently. Upon recharging such kind of batteries, however, there has occurred often a trouble such that, in the event where the battery is overcharged due to any fault of the charger or when an actuating pressure of safety valve of the battery is lowered in the last period of inherent life of the battery, the battery being charged generates hydrogen gas, which gas is casued to flash or ignite by an arc occurring at charging terminals upon mounting or dismounting of the battery pack with respect to the charger, the generated gas may happen to accumulate in the battery pack so that, upon being mounted to the machine or the like, the hydrogen gas will invade into machine body to be caused to draw fire by the arc of incorporated motor, switch or the like, and so on. In the case of the nickel-hydrogen battery, in particular, hydrogen is charged in the battery, and the above problems have been apt to readily occur.

In order to eliminate such problem, a Japanese Utility Model Publication No. Hei 5-37634 has disclosed an arrangement in which a battery pack is provided with an aperture, a charger is provided with a blower so that, when the battery pack is mounted to the charger with respect to the aperture, any heated air within the battery pack will be forcibly discharged by a blower.

In Japanese Utility Model Laid-Open Publication No. Hei 5-84023, there has been suggested another arrangement in which a connecting part between the charger and the battery pack is provided with a vent hole for exhausting the hydrogen gas.

In another Japanese Utility Model Laid-Open Publication No. Hei 6-54209, there has been disclosed a charger which blasts air with an incorporating blower into a battery pack having holes at mutually opposing positions, cause a ventilation through the interior of the battery pack.

In the first mentioned publication 5-37634, however, there has been a problem that the blower in the charger is positioned remote from the aperture of the battery pack so that air from the blower does not reach efficiently the aperture. Further, a heated air due to heat generation of a transformer or the like in a charging circuit is also blasted by the blower, and the battery cannot be efficiently cooled, as another problem. Further, an air current generated by the blower is directed diagonal in accordance with a slant of vanes as an inherent characteristic of blower fan, so that, the cooling effect for the batteries positioned in the direction of such diagonal air current generated by the blower will be higher but the effect for the batteries not positioned in the particular direction will be lower. For this reason, there arises a further problem that the batteries as a whole cannot be cooled uniformly, the cooling effect of the entire battery pack is lowered, and eventually exhausting effect of hydrogen gas is also lowered. Yet, an exhaust port for interior air inside the battery pack is disposed on a side wall and closer to a vent port leading air current into the pack, so that the air current cannot reach the whole area inside the battery pack, the blasted air of the blower does not reach the respective batteries effectively, due to also the remote position from the aperture of the battery pack as has been referred to, and the discharge effect for the hydrogen gas is also insufficient, in addition to the low cooling effect, as another problem.

In the case of the foregoing publication 5-84023 in which the vent hole is provided at the connecting part between the charger and the battery pack for discharging the hydrogen gas, there has been a risk that it has required a long time until the hydrogen gas is fully discharged and the gas may even be left without being fully discharged.

In the case also of the foregoing publication 654209 where the blower in the charger blasts air into the battery pack through the mutually opposing holes of the pack, the holes are made in laterally opposing walls of the battery pack, the hydrogen gas is caused thereby to stay in upper part of the battery pack without being fully discharged, and even hot air due to the heat generation of the batteries will also stay in the upper part of the battery pack without being discharged, and the cooling effect is deteriorated, to be further problems unsolved. There still has been a risk that, because the battery pack is to be mounted and dismounted with respect to the charger, there has been a gap between the vent ports of the battery pack and the blast ports of the charger, so that the blasted air is caused to leak to the exterior, to lessen the vent air sent to the battery pack and thus the cooling effect is further deteriorated.

SUMMARY OF THE INVENTION

An object of the present invention is present invention is to provide a charger capable of overcoming the respective problems in the foregoing related art, blasting a larger amount of air into the battery pack highly efficiently, discharging highly efficiently the hydrogen gas generated by the batteries highly efficiently, and elevating the battery cooling effect and gas discharging effect. Another object is to provide a charger capable of uniformly cooling a plurality of batteries with a simpler structure even when the diagonal air current is caused to enter through the vent ports due to characteristics of vanes of the blower. Still another object is to provide a charger which is capable of allowing the blasted air from the blower to readily reach the entire range in the interior of the battery pack, so as to be able to sufficiently and uniformly cool the respective batteries and to fully discharge the hydrogen gas in a short time.

According to the present invention, the above objects can be realized by means of a charger comprising a battery pack housing therein a plurality of batteries and having a projection provided on outer periphery with a contacting terminal means, first vent ports in a side wall on which the projection is disposed, and second vent ports in an opposite side wall to that of the first vent ports; and a charger section having a mounting hole provided on inner periphery with a charging terminal means for charging the batteries in the battery pack with the projection thereof mounted in the mounting hole, blast ports made at positions opposing the first vent ports of the battery pack as mounted, and a blower for blowing air towards the blast ports, the air thus blown being blast from the blast ports through the first vent ports into the interior of the battery pack. When the battery pack is set onto the charger section with the projection mounted in the mounting hole, therefore, the first vent ports of the battery pack can be opposed to the blast ports of the charger section, so that much air can be blown from the blower through the blast ports and first vent ports into the battery pack, and the plurality of batteries can be efficiently cooled while being charged.

Other objects and advantages of the present invention shall become clear as the description of preferred embodiment of the invention advances as detailed with reference to accompanying drawings showing the embodiment.

BRIEF DESCRIPTION OF THE DRAWINGS

FIG. 2 is a top plan view showing the embodiment of FIG. 1 in a state where the battery pack is set onto the charger section;

FIG. 4b is a sectioned view of the charger section in the embodiment of FIG. 4a;

FIG. 5 is a sectioned view for explaining a state of air flow caused by the blower in the charger section of FIG. 4a;

FIG. 7b is a top plan view showing the discharge ports of the battery pack in the embodiment of FIG. 7a;

FIG. 8a is a side view of the battery pack in the embodiment of FIG. 7a;

FIG. 8b is an explanatory view for the interior structure of the battery pack in the embodiment of FIG. 7a;

FIGS. 10–12 are sectioned views for explaining air flow caused by the blower in other embodiments of the present invention;

Figure 1:
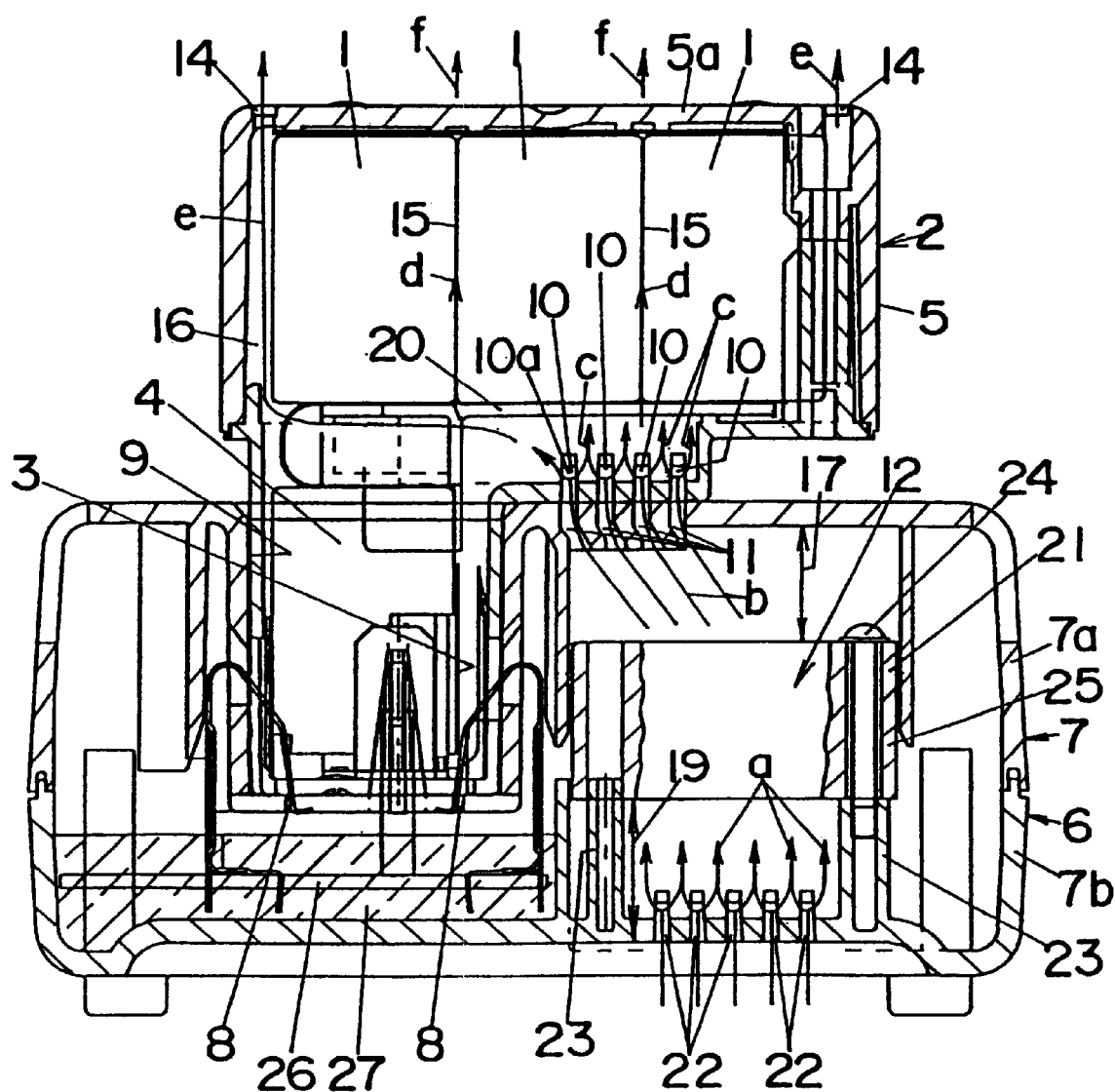
FIG. 1 shows the charger in an embodiment according to the present invention in a sectioned view taken along a line A—A in FIG.2.

While the present invention shall now be described with reference to the respective preferred embodiments shown in the drawings, it should be appreciated that the intention is not to limit the invention only to these embodiment but rather to include all alterations, modifications and equivalent arrangements possible within the scope of appended claims.

DETAILED DESCRIPTION OF THE PREFERRED EMBODIMENTS

Referring to FIG. 1, the charger according to the present invention comprises a battery pack 2, in which a plurality of batteries 1 are disposed on a battery fixing plate 20 provided within a battery pack case 5. For the batteries 1, nickel-cadmium battery or nickel-hydrogen battery, for example, is employed. The battery pack case 5 is provided at its bottom side wall with a projection 4 having on its periphery contacting terminals 13, and with a plurality of vent ports 10 formed at positions not overlapping with the projection 4. These vent ports 10 are forming first vent ports provided in correspondence with later described blast ports 11 of a charge section 6. In the present embodiment, the vent ports 10 respectively have an internally opposing member for directing air current entering from downward opening of the respective ports to be dispersed once sideward and then into the interior of the battery pack 5, as shown by arrows "c" in FIG. 1. In a top side wall 5a opposite to the bottom side wall in which the vent ports 10 are formed, a plurality of discharge ports 14 are formed, at least part of which ports 14 being regarded as second vent ports. In the present embodiment, the discharge ports 14 include ones which are formed in peripheral walls of the battery pack case 5 (not shown), and these discharge ports 14 are provided respectively to oppose each clearance 15 between the respective batteries 1 as well as each clearance 16 between the respective batteries 1 and the battery pack case 5, so that air flow blasted through the vent ports 10 into the battery pack case 5 passes through these clearances 15 and 16 and is then discharged from the discharge ports 14.

Figure 3A:
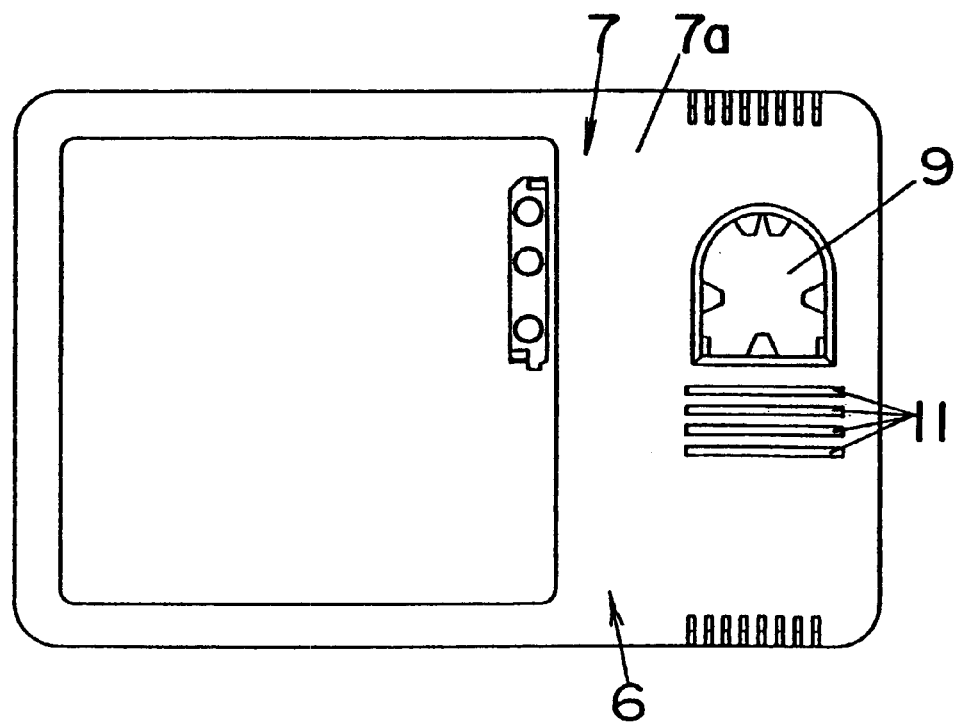
FIG. 3a is a top plan view of the charge section in FIG. 1.

In the charge section 6, on the other hand, a charger case 7 has a mounting hole 9 indented from a top side wall to open upward, and blast ports 11 at positions in the top side wall opposing the vent ports 10 of the battery pack case 5. This charger case 7 comprises upper and lower case halves 7a and 7b, and the upper case half 7a is formed to have the mounting hole 9 for receiving the projection 4 of the battery pack 2, as well as the blast ports 11 opposing the vent ports 10 of the battery pack 2. The blast ports 11 are provided as passed vertically through a thickened part formed in the top side wall of the upper case half 7a, in the present embodiment as seen in FIGS. 1 and 3a. The respective blast ports 11 are slanted at lower, inward openings toward the center of a blast side of a blower 12 disposed below the blast ports 11, while upper, outward openings of the blast ports 11 extend vertically, and top ends of these blast ports 11 oppose respectively each downward end of the respective vent ports 10 of the battery pack 2, whereby the top ends of the blast ports 11 and the downward ends of the vent ports 10 are brought into communication with each other in a state where the projection 3 of the battery pack 2 is mounted into the mounting hole 9 of the charger section 6, and relatively a much more amount of air can be blown from the blower 12 into the battery pack 2.

Figure 3B:
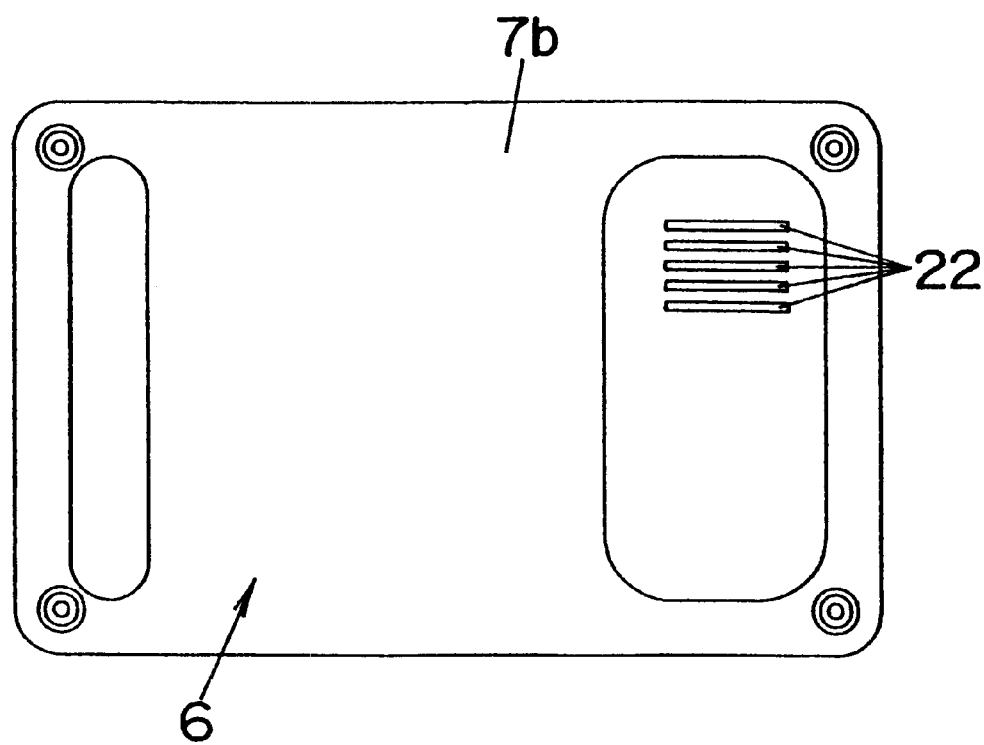
FIG. 3b is a bottom pl-an view of the charger section of FIG. 1.

In bottom wall of the lower case half 7b, a plurality of intake ports 22 are formed to intake exterior air into the case 7, as shown in FIGS. 1 and 3b. Screw cylinders 23 are provided on the bottom wall around the intake ports 22 for fixing the blower 12, so that the blower 12 can be fixed inside the lower case half 7b by screwing screws 24 through screw holes 25 into the screw cylinders 23. Here, the blower 12 is disposed to be substantially intermediate position in vertical direction of the charger case 7, and a predetermined upper clearance is defined between the blast ports 11 and the blower 12, while a predetermined lower clearance 19 is defined between the blower 12 and the intake ports 22. With these clearances 17 and 19, air is caused to be accumulated on both of intake side and blow-off side of the blower 12, and the blow rate of the blower 12 can be increased. Further, the blower 12 is disposed on a side position of the mounting hole 9, and interior space of the mounting hole 9 is made to communicate with the intake side of the blower 12, whereby any hydrogen has generated around charging terminals 8 disposed inside the mounting hole 9 can be sucked by the blower 12 so as to be discharged through the blast and vent ports 11 and 10 and discharge ports 14 of the battery pack 2 to the exterior.

The charging terminals 8 inside the mounting hole 9 are so disposed that, upon mounting of the projection 4 of the battery pack 2 into the mounting hole 9, the contacting terminals 3 come into contact with the charging terminals 8, and the charging of the batteries 1 inside the battery pack 2 is performed. The charger section 6 includes a printed circuit board 26 to which the charging terminals 8 are properly mounted, a resin molded part 27 and a power-source connector cord 28 (see FIGS. 1 and 2). A charging circuit (heat generating circuit parts) illustration of which is omitted is disposed at different position from that of the blower 12, mounting hole 9 and charging terminals 8 in the charger case 7.

Thus, as the projection 4 of the battery pack 2 is mounted in the mounting hole 9 of the charger section 6 to bring the contacting terminals 3 of the projections 4 into contact with the charging terminals 8 in the mounting hole 9, as in FIG. 1, the charging is started. At this time, the vent ports 10 provided in the wall on which the projection 4 is formed in the battery pack case 5 are brought into conformity to the blast ports 11 in the top wall of the charger case 7, and the blower 12 in the charger case 7 actuated sucks the exterior air from the intake ports 22 of the charger case 7 in a direction shown by arrows via" in FIG. 1, whereby the blown air from the blower 12 is transmitted from the blast ports 11 through the vent ports 10 into the battery pack 2, as shown by arrows "b" and "c" in FIG. 1. As further shown in FIG. 1 with arrows "d", "e" and "f", the thus transmitted air passes through the clearance 15 between the respective batteries 1 as well as the clearance 16 between the batteries 1 and the battery pack case 5 to sufficiently cool the respective batteries 1, and can be thereafter discharged to the exterior through the discharge ports 14 provided in the top wall and peripheral side walls of the battery pack case 5.

Here, the arrangement is so made that, when the projection 4 is mounted in the mounting hole 9, the vent ports 10 of the battery pack 2 can be positioned to oppose the blast ports 11 of the charger section 6, and the blown air of the blower 12 can be transmitted through the blast parts 11 and vent ports 10 efficiently into the battery pack 2 at a relatively high flow rate. Further, the blower 12 is positioned as separated from the blast ports 11, so that the blown air can be accumulated in the clearance 17 between the blower 12 and the blast ports 11, the blown air rate of the blower 12 can be further increased, and eventually the plurality of the batteries 1 in the battery pack 2 can be fully and highly efficiently cooled by the blown air of the blower 12. Accordingly, even in the event where the nickel-cadmium or nickel-hydrogen batteries are employed, it is possible to attain a temperature below a temperature at which the nickel-cadmium battery is apt to cause a failure (about 60–70°) or below a temperature at which the nickel-hydrogen battery is apt to cause a failure (about 55°), any of such trouble as internal short-circuit, capacity drop or the like can be reliably prevented from occurring during the charging, any trouble occurrence can be eliminated even when the batteries 1 are charged immediately after being used at a high load, and an accelerated charging is made possible without temporary interruption of the charging due to a temperature sensor and eliminating any loss-time for the charging.

Further, as the blower 12 is disposed on a side position of the mounting hole 9 in which the charging terminals 8 are provided, the hydrogen gas even generated from such batteries 1 as the nickel-cadmium or nickel-hydrogen batteries during the charging and accumulated around the charging terminals 8 present at generating source of the hydrogen gas can be sucked by the blower 12 to efficiently discharge, with a sufficiently elevated gas discharging effect.

Accordingly, it is enabled to prevent a stagnation of the hydrogen gas from occurring around the charging terminals 8 or within the batteries 1, such flashing of hydrogen gas as has been occurring conventionally can be prevented completely, and the safetyness can be sufficiently elevated. Further, with the provision of the vent ports 10 and discharge parts 14 in the wall of the battery pack 2 on the side facing the charger section 6 and in the wall opposite to the former, any air caused to be warmed by the hydrogen gas or by generated heat of the batteries and to ascend will not be allowed to accumulate inside the battery pack 2 but to be effectively discharged to the exterior, so as to elevate the cooling effect.

Further, as the arrangement is so made that, even if the airflow generated by the blower 12 is in diagonal direction as shown by the arrows "b" in FIG. 1, the respective vent ports 10 are formed in vertical direction and the internally opposing member of these vent ports 10 render the blasted air from the ports to be dispersed sideward, the airflow led inside the battery pack 2 is made to fluidize between the respective batteries 1 as well balanced, so that the plurality of batteries can be eventually cooled uniformly to further elevate the cooling effect and the effect of discharging the hydrogen gas can be also elevated simultaneouly.

Further, the battery pack 2 is provided to be mounted and dismounted as shifted in vertical direction, and the blast ports 11 on the side of the charger section 6 are made in the wall which faces the battery pack 2 in such vertical shifting direction of the pack for intimate engagement with the vent ports 10 of the battery pack 2, so that much more air can be transmitted into the battery pack 2 through the intimately engaging ports 10 and 11. Further, by the provision of the vent and blast ports 10 and 11 in the vertically engaging walls, their intimate engagement can be assured even when the charger section 6 and battery pack 2 involve certain dimensional fluctuation.

Figure 4A:
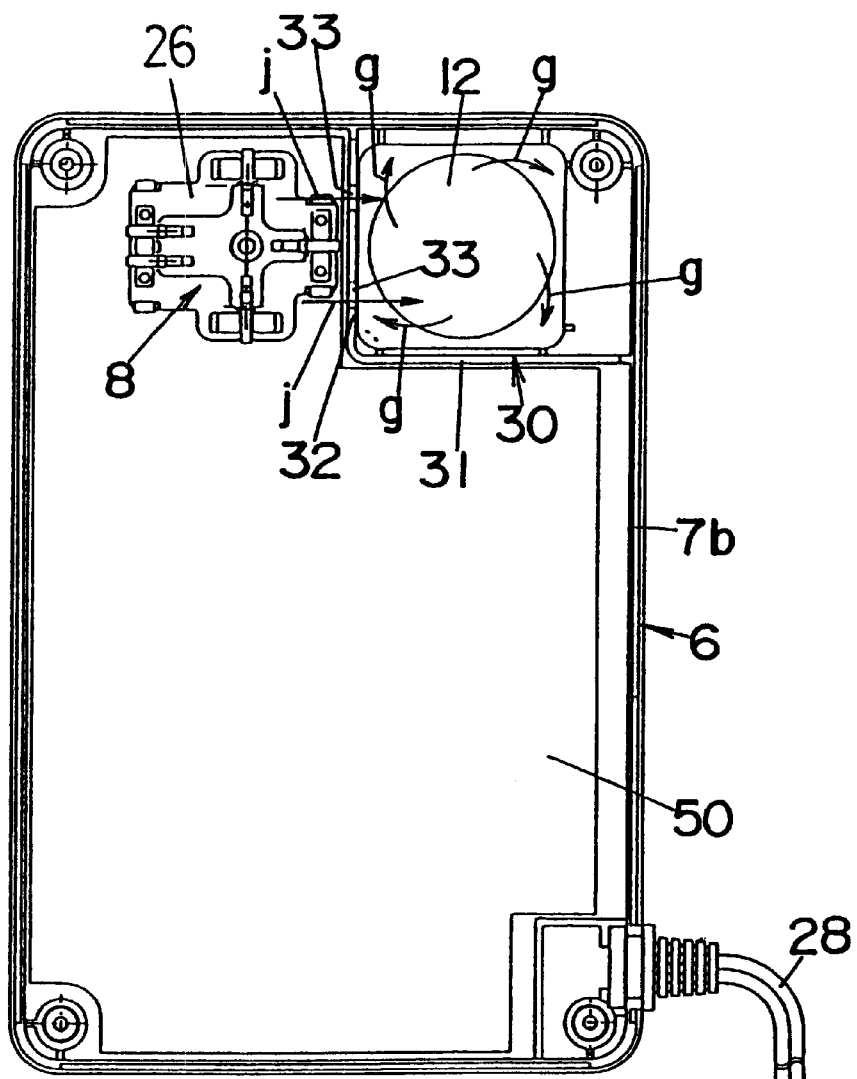
FIG. 4a is an explanatory plan view for a state of air flow as blown by the blower in another embodiment of the present invention.
Figure 4B:
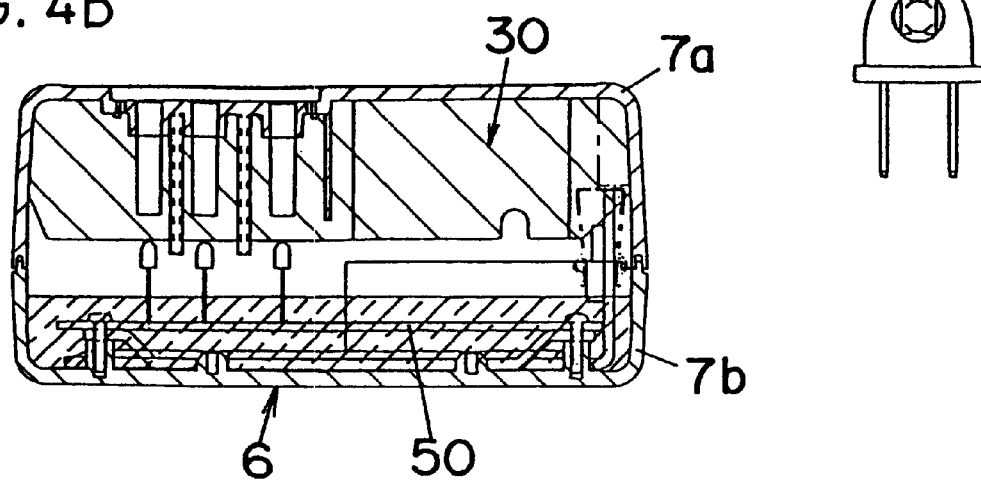
Figure 5:
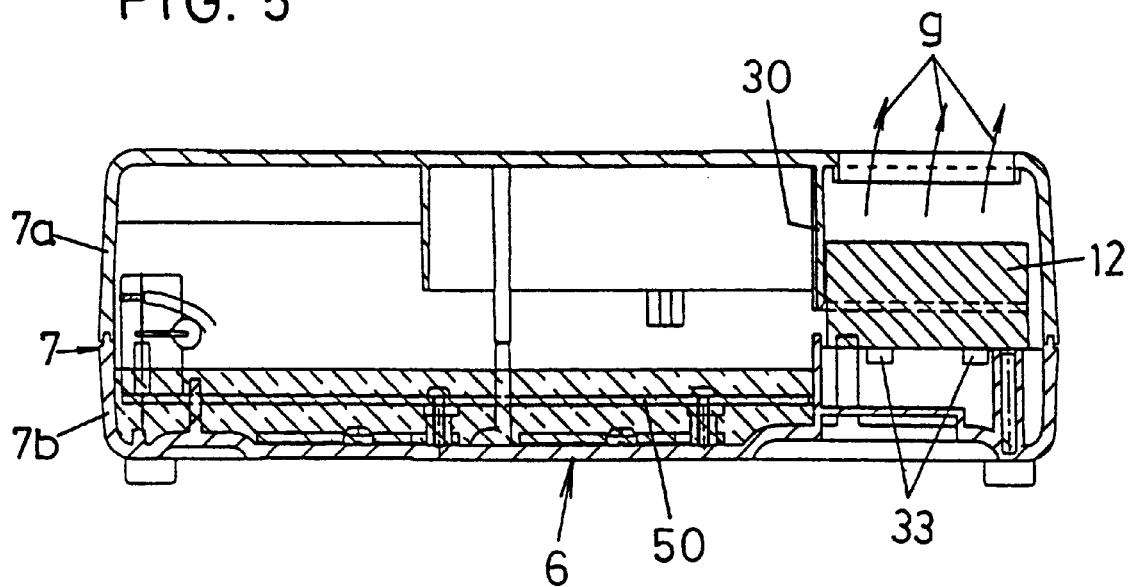

In FIGS. 4 and 5, there is shown another embodiment of the present invention, in which a shielding wall part 31 is provided between the heat generating circuit parts and the blower 12 both provided in the charger section 6 for shielding heat, while no shield is provided between the blower 12 and the charging terminals 8 of the mounting hole 9 provided in the charger section 6. A printed circuit board 50 on which the heat generating circuit parts are mounted is provided in the charger section 6. Other constituents are the same as those in FIG. 1 and are denoted in FIGS. 4 and 5 by the same reference symbols as those used in FIG. 1. In this embodiment, as seen in FIG. 4a, a heat shielding partition 30 is formed integral internally with the upper case half 7a in an L-shape in plan view, and one leg part of this L-shape partition 30 where no notch or aperture is made is used as the shielding wall part 31, whereas the other leg part of the partition 30 is made to be a wall part 32 having a plurality of notches 33. In the present embodiment, as seen in FIG. 4a, two of the notches 33 are provided in the wall part 32, which number may be properly increased or decreased.

Accordingly, by the provision of the heat shielding wall part 31 between the blower 12 and the heat generating circuit parts provided in the charger section 6, it is possible to prevent air warmed up by the generated heat of such charging circuit part as the transformer from being transmitted toward the battery pack 2. As the heat transmission from the blower 12 can be thus made less, the blown air current of the blower 12 can be maintained to be low in the temperature, and the cooling effect with respect to the batteries 1 can be elevated. Further, with the provision of the notches 33 in the wall part 32 between the charging terminals 8 and the blower 12, air current between the charging terminals 8 and the blower 12 is not intercepted but can be rather promoted by the notches 33. Thus the arrangement is so made that the heat of the heat generating circuit parts can be shielded by the shielding wall part 31 of the partition 30, so that, upon generation of the hydrogen gas at the batteries 1, the hydrogen gas around the charging terminals 8 at the gas generating source can be sucked by the blower 12 through the notches 33 as shown by arrows "j" in FIG. 4a, and the gas discharge effect can be elevated.

Figure 6:
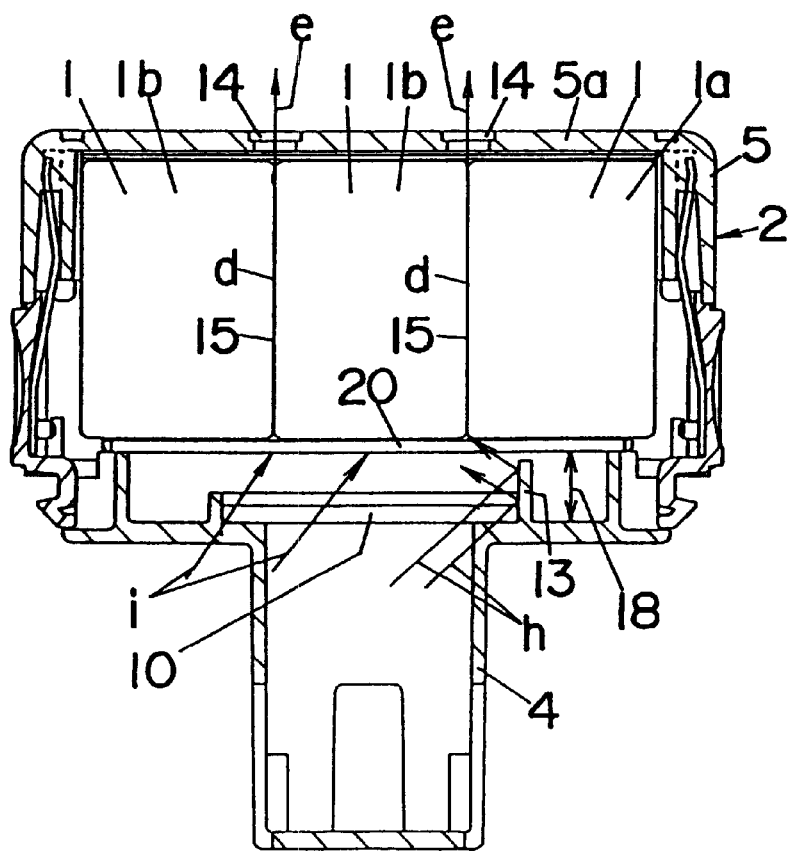
FIG. 6 is a sectioned view showing the interior structure of the battery pack in another embodiment of the present invention.

Referring to FIG. 6, the battery pack case 5 is provided at an interior vent opening 10 of the projection 4 with a rib 13 for reflecting the air current caused to be in diagonal direction due to the slant of the vanes in the blower 12, so that the rib 13 will constitute an air diffuser means. Other constituents are the same as those in FIG. 1. The air current caused by the blower 12, for example, will be in diagonal direction in accordance with the slant of the rotating vanes as shown in FIGS. 4 and 5 by arrows "g" in FIGS. 4 and 5 because of operating characteristics of fans. When the interior vent opening 10 of the projection 4 is formed in a single large aperture, it is possible to cool the batteries 1a positioned in the direction of blown air current, whereas the batteries 1b positioned not in the direction of blown air current will be apt to be lowered. In the present embodiment of FIG. 6, the rib 13 is erected along a side periphery of the vent opening 10 inside the battery pack 2 for reflecting the diagonal air current. This rib 1 3 is so constituted that, in the diagonal air currents "h" and "i" led in from the vent ports 10, the diagonal air current "h" can be prevented from being deviated into a clearance 18 defined between the batteries 1a disposed edgewise and the bottom side of the battery pack case 5, and the rib 13 has a height set to be effective to cause the diagonal air current "h" reflected thereon to be led uniformly to the respective batteries 1a and 1b. Accordingly, even when the vent opening 10 is formed with the single large aperture, the air current "h" is made to reflect on the rib 13 so as to flow as well balanced into the clearance 16 between the respective batteries 1, as shown by arrows "d" and "e" in FIG. 6, to be able to uniformly cool the respective batteries 1, and to be able to efficiently discharge even the hydrogen gas generated. That is, with the provision of such erected rib 13 of simple structure along the side periphery of the vent opening 10, it is possible to increase the blasting air rate while still elevating the cooling effect and gas discharge effect.

Figure 7A:
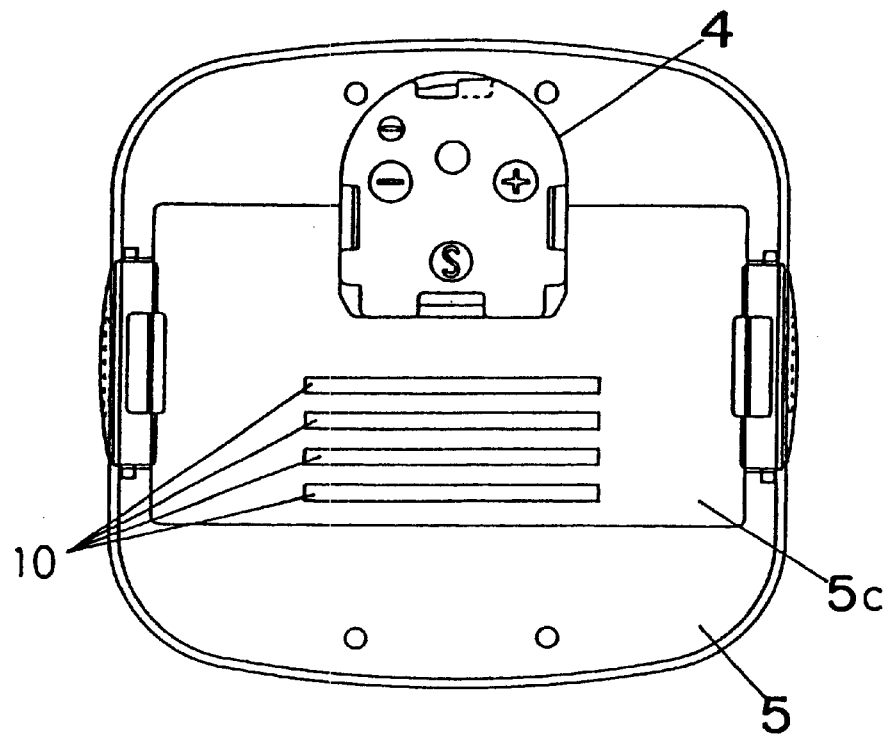
FIG. 7a is a bottom plan view showing the vent ports made in the battery pack in another embodiment of the present invention.
Figure 7B:
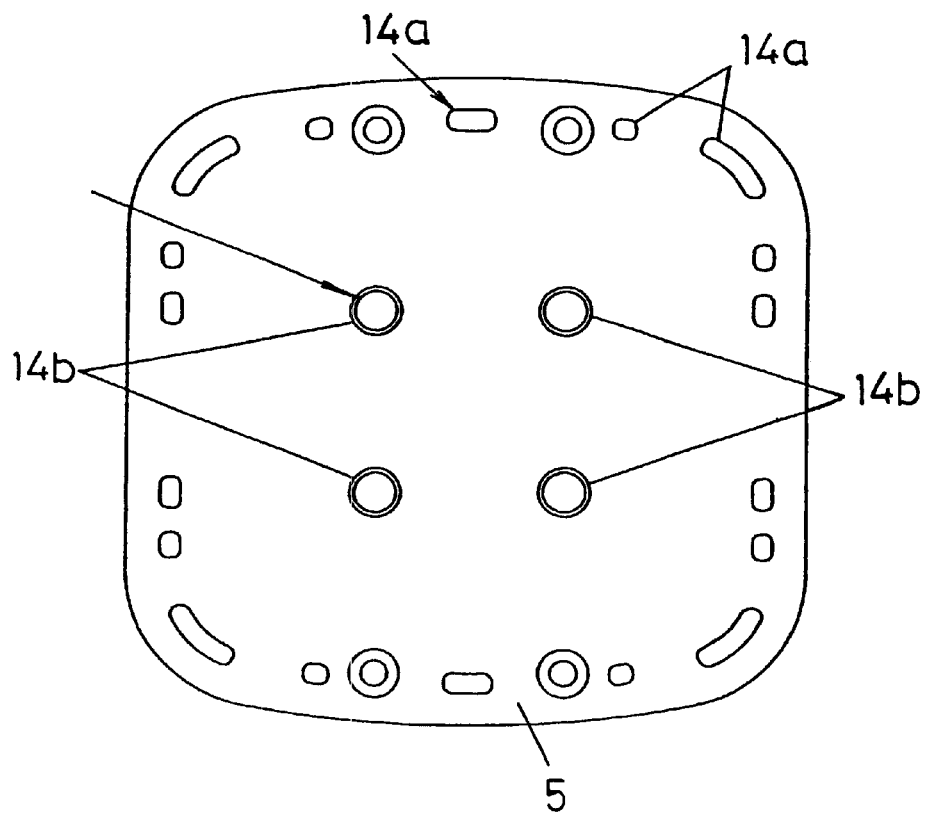
Figure 8A:
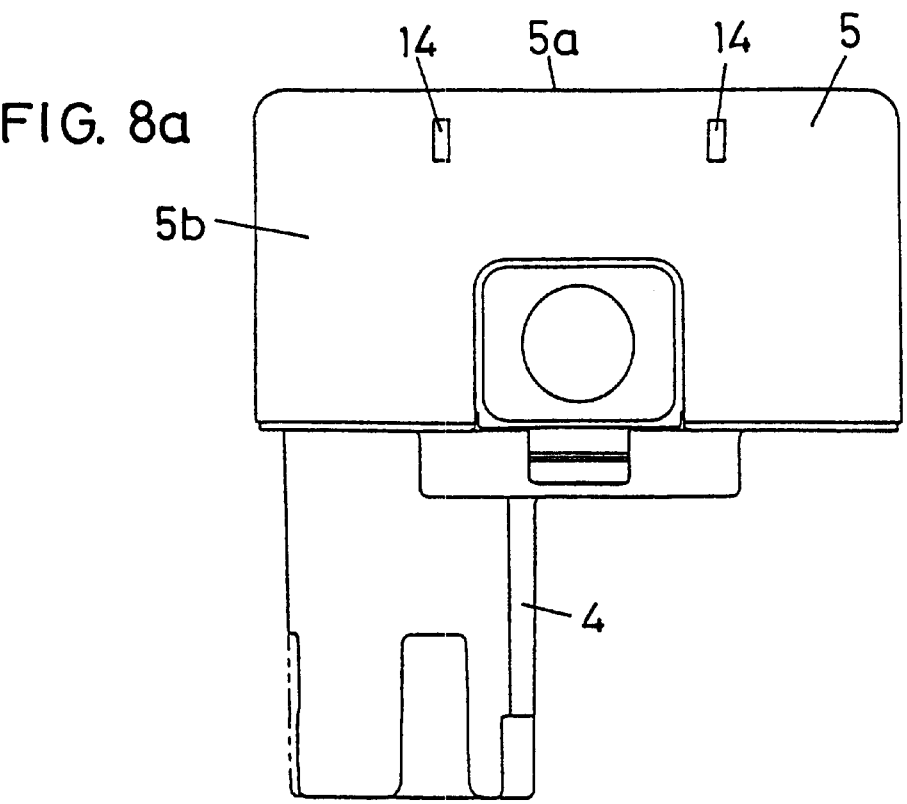
Figure 8B:
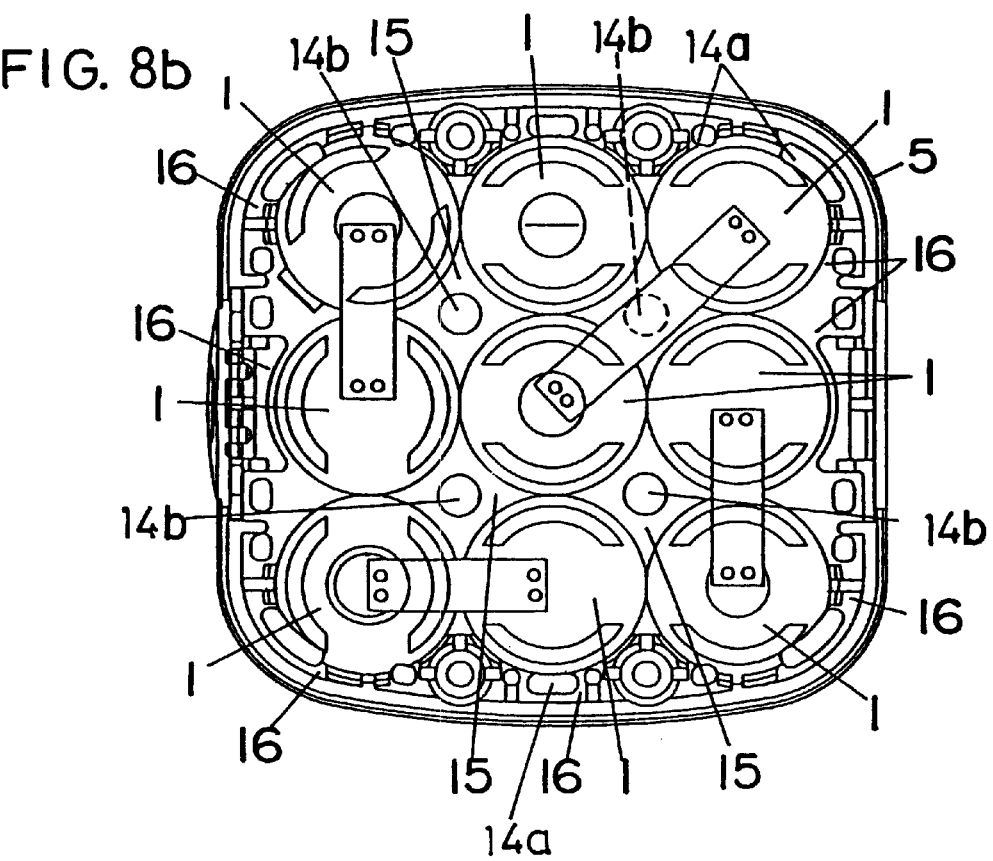

In another embodiment shown in FIGS. 7 and 8, the discharge ports 14 are provide in the top wall 5a opposite to the bottom wall 5c in which the vent ports 10 are made, and in peripheral side wall 5b at positions closer to the top wall 5a, respectively of the battery pack case 5, and these discharge ports 14 are respectively opposed to the clearances 15 between the respective batteries 1 and the clearances 16 between the batteries 1 and the case 5. Here, the vent ports 10 in the bottom wall 5c of the case 5 are provided to open in a plurality (for example, four) of slits, as shown in FIG. 7a, and the discharge ports 14 made in the peripheral side wall 5b of the case 5 are opened in a rectangular shape at the positions closer to the top wall 5a of the case 5, as shown in FIG. 8a. Further, the discharge ports 14 in the top wall 5a include many outer peripheral discharge ports 14a provided along the outer periphery of the top wall of the case 5, and a plurality (for example, four) of central discharge ports 14b provided in the central part. The outer peripheral discharge ports 14a are respectively disposed to oppose each clearance 16 between the batteries 1 and the case 5, while the central discharge ports 15b are respectively disposed to oppose each clearance 15 between the respective batteries 1. While in the present embodiment the discharge ports 14 are shown to be provided in both of the top and side walls 5a and 5b of the case 5, these ports are not always required to be provided in both walls, but it is possible to have only one of the top and side walls 5a and 5b provided with the discharge ports 14.

Accordingly, the blast air from the vent ports 10 into the battery pack case 5 flows into the clearances 15 between the respectivel batteries 1 and into the clearances 16 between the batteries 1 and the case 5, and is then discharged out of the discharge ports 14a and 14b in the top wall 5a and in the side wall 5b at closer positions to the top wall 5a of the case 5. Therefore, the blast air is made to readily reach all zones in the interior of the battery pack 2, and can sufficiently fluidize effectively with respect to the batteries 1. Further, as the discharge ports 14a and 14b are provided in the top wall 5a and side wall 5b at closer positions to the top wall of the battery pack case 5 so as to be remote from the vent ports 10, the blast air led in from the vent ports 10 can be prevented from being discharged immediately out of the discharge ports. Therefore, the blown air by the blower 12 can be further fully distributed to the respective batteries 1, as a result of which the respective batteries 1 can be fully and uniformly cooled, it does not require any long time until the full discharge of the hydrogen gas but requires only a short time therefor, and any risk of causing the hydrogen gas to remain without being fully discharged can be eliminated.

Figure 9:
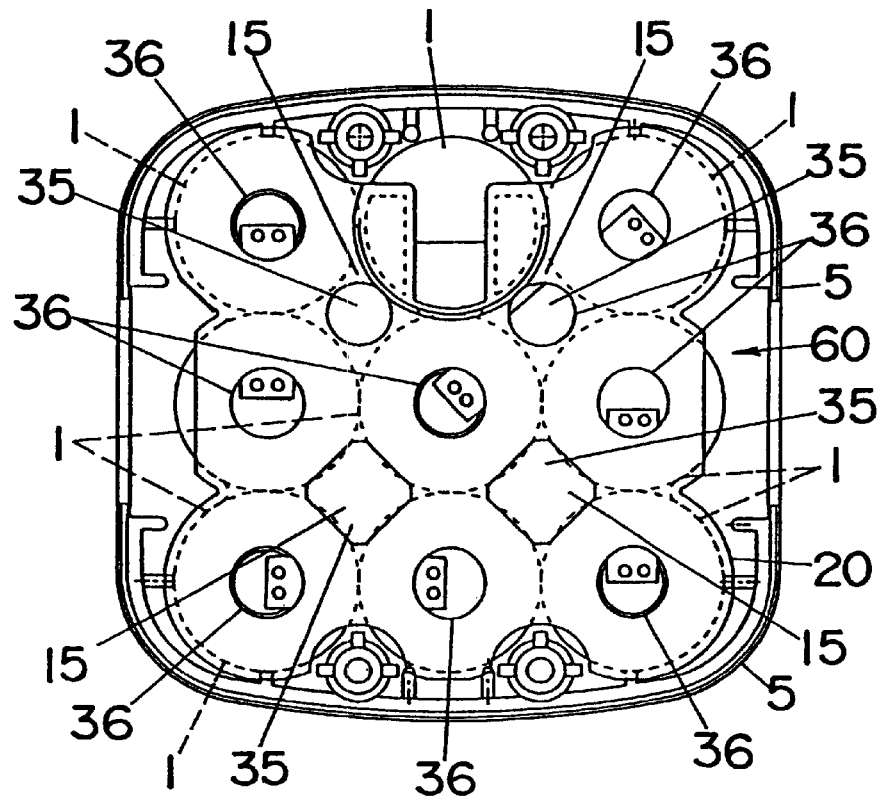
FIG. 9 is an explanatory view for apertures made in a battery fixing plate in another embodiment of the present invention.

In another embodiment shown in FIG. 9, a battery fixing plate 20 is formed to have apertures 35 made respectively at positions opposing the clearances 15 between the batteries 1, and ventholes 36 made respectively at positions opposing axial metal part of each battery 1, and the fixing plate 20 is also formed to be separated at outer peripheral edge from inner periphery of the side wall of the battery pack case 5. Accordingly, the blown air by the blower 12 can be made to fluidize through the apertures 35 of the battery fixing plate 20 and into the clearances 15 between the batteries 1, and simultaneously the air can be applied through the ventholes 36 to the metal parts, so that the metal parts of the batteries 1 can be directly cooled. Further, since a gap 60 made by the separation of the outer peripheral edge of the battery fixing plate 20 from the inner periphery of the battery pack case 5 is axially opposing the clearances 16 between the batteries 1 and the case 5, the blast air can be also fully fluidized in the clearances 16 between the batteries 1 and the case 5, and the cooling effect for the batteries 1 can be further improved. In addition, the provision of the gap 60 between the outer peripheral edge of the battery fixing plate 20 and the inner periphery of the case 5 allows no further aperture or apertures required to be made at the position opposing the gap 60, and the battery fixing plate 20 can be made simpler in its structure.

FIG. 10 shows the air flow in the arrangement in which the center of the blower 12 is deviated from the vent ports 10 of the battery pack 2. In the charger section 6, the blown air B from the blower 12 expands spirally from the center of the blower 12, and blown air B is made stronger on outer peripheral side of the blower 12. That is, a higher blown air pressure is occurring on the outer side of the center of the blower 12, this outer blown air at the higher pressure can be transmitted from the blast ports 11 positioned deviated from the center of the blower 12 to the vent ports 10 of the battery pack 2, and the transmitting air flow rate to the pack 2 can be further increased.

Figure 11:
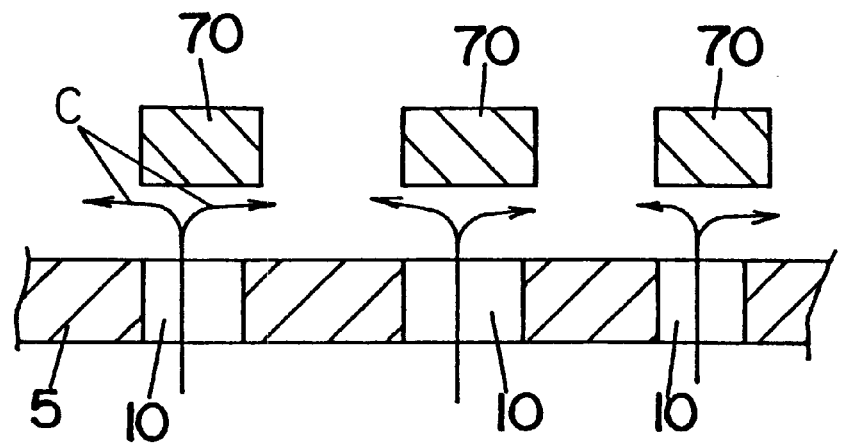

As shown further in FIG. 11, the blast-air dispersing members provided inside the vent ports 10 are formed in the form of ribs 70 opposing the ports 10, for preventing the blast airflow from linearly directly entering into the battery pack 2, which ribs 70 are formed in a lattice shape, covering the ports 10 with an inward gap. Accordingly, the airflows entered through the vent port 10 into the pack 2 are caused by the ribs 70 to be dispersed in the direction of arrows C, whereby the airflows can be prevented from directly entering into the pack 2 but can be expanded. With such ribs 70, it is also possible to prevent any dust or such foreign matter as a nail from entering into the battery pack 2.

While in the respective foregoing embodiments the vent ports 10 of the battery pack 2 are referred to as being opened in vertical direction, they may be not required to be limited to of such vertical ports, but it will be also possible to form the vent ports 10, for example, diagonally through the wall of the battery pack case 5. In this case, the vent ports 10 are opened in diagonally upward direction, so as to be able to disperse the airflow, while preventing such foreign matter as the nail from being inserted into the battery pack 2, so as not to allow the nail to directly hit the batteries.

Figure 13:
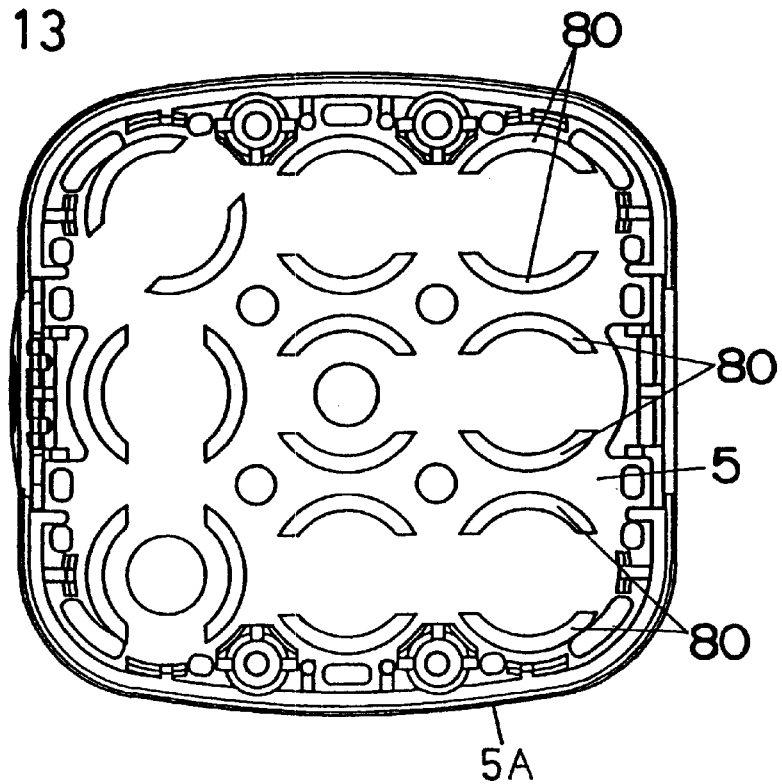
FIG. 13 is an explanatory view for the interior structure of a battery pack case in the embodiment of FIG. 12.
Figure 12:
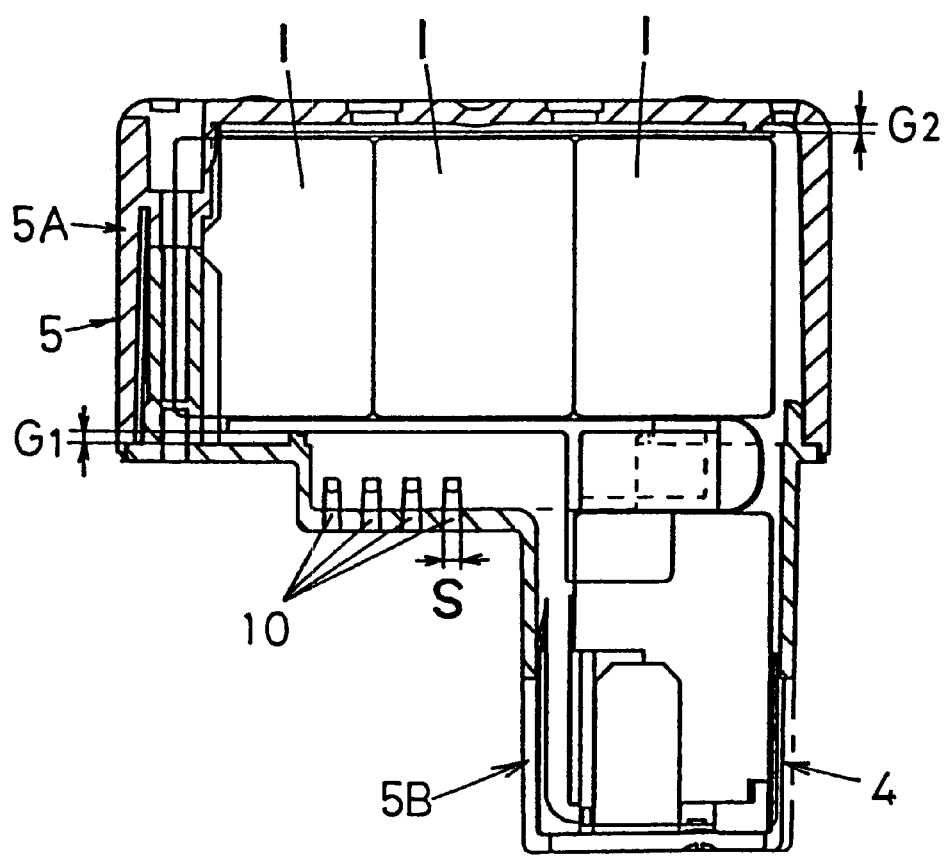

In another embodiment shown in FIG. 12 of the present invention, the battery pack 2 is formed to have, in addition to the vent ports 10 made in the same bottom wall as that having the projection 4 and the discharge ports 14 in the opposite top wall of the battery pack case 5, bottom and top clearances G1 and G2 forming ventilation paths lying between the bottom wall and the batteries 1 and between the top wall and the batteries 1, respectively, in a direction intersecting blowing direction and in parallel to the top and bottom walls of the case 5. The airflow entered into the battery pack 2 is caused, therefore, to expand first through the bottom clearance G1 over the whole of the interior of the battery pack 2, then through the clearances between the respective batteries and between the batteries 1 and the case 5 to reach the top clearance G2 on the top side of the case 5, and to be eventually discharged through the discharge ports 14. With this arrangement, it is enabled to disperse the airflow widely within the battery pack 2, and to uniformly cool the whole battery pack 2. In this case, as an example of measures for providing the clearances on the top and bottom sides of the battery pack case 5, as shown in FIG. 13, the top clearance G2 may be formed between the top wall of the case 5 and the battery fixing plate 20 as in FIG. 12, by providing to the plate 20 arcuate ribs 80 protruded inward at a plurality of positions as mutually spaced and at the same height. It is also possible to form the clearance G1 by providing similar ribs so as to project on the bottom wall of the case 5. Further, it is preferable that the top and bottom clearances are formed to have a cross sectional area larger than that of the vent ports 10 (S×4 in the case of FIG. 12) of the battery pack 2. In this case, the top and bottom clearances are effective to prevent a spread of the airflow widely dispersed as blasted through the vent ports 10 from being restricted. Further, while FIG. 12 shows the battery pack case 5 comprising upper and lower case halves 5A and 5B, the invention is not always limited to this structure of the case 5.

Figure 14:
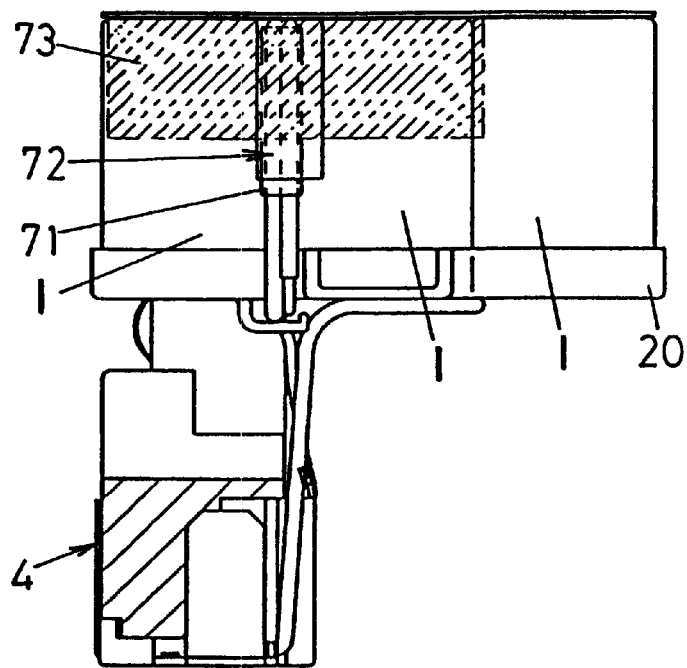
FIG. 14 is an explanatory view for the interior structure of the battery pack in another embodiment of the present invention, with the battery pack case removed.

In another embodiment shown in FIG. 14 of the present invention, there is formed a non-ventilative space in a predetermined part of the clearances between the respective batteries, and means for detecting temperature of the batteries is disposed in this non-ventilative space. The temperature detecting means 71 may be, for example, a temperature sensor, thermoswitch of the like. The temperature sensor 71 here is disposed in one clearance between a pair of the batteries 1 and is enclosed in a cushion member 72 which in turn is held against the batteries with a tape 73 wound or adhered to the batteries, so that the non-ventilative space is defined by the cushion member 72, in which space the temperature sensor 71 is disposed. As the temperature of the batteries 1 is to be detected by the temperature sensor 71 or the like disposed in the non-ventilative space, it is enabled to directly detect the battery temperature, to prevent the temperature sensor 71 from being hit by the airflow transmitted into the battery pack 2, and to accurately detect the battery temperature. Even in an event where any external shock is given to the battery pack 2, such shock may be absorbed by the cushion member 72, and the temperature sensor 71 can be sufficiently protected. The arrangement for holding the temperature sensor 71 may not be limited to the one of this embodiment in FIG. 14.

Figure 15:
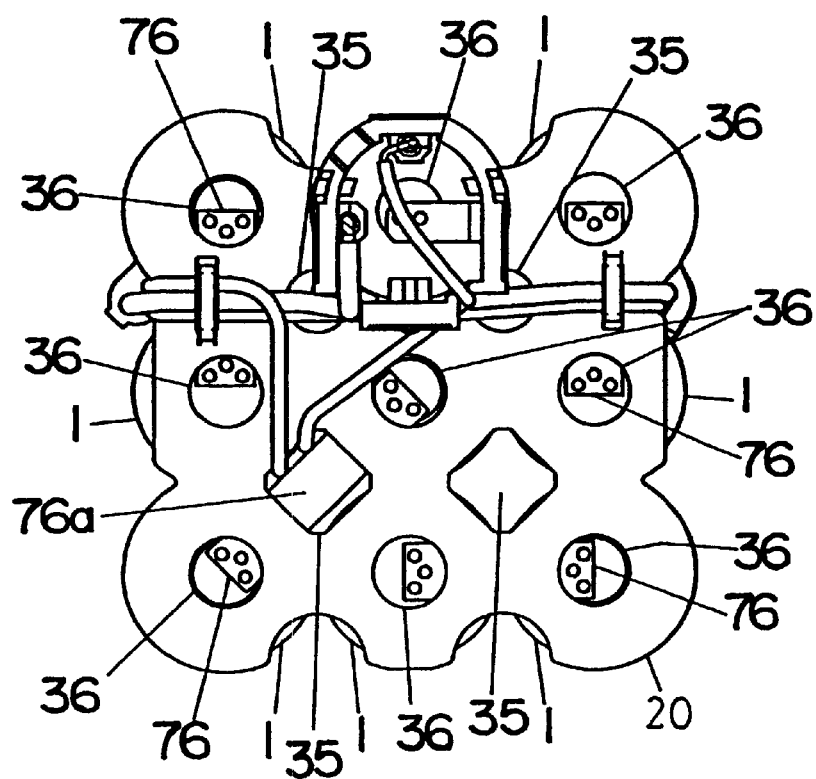
FIG. 15 is an explanatory view for the interior structure of the battery pack in another embodiment of the present invention, with the battery pack case removed.

In another embodiment shown in FIG. 15 according to the present invention, the non-ventilative space is formed by utilizing connector plates 76 each connecting mutually a pair of electrodes of adjacent ones of the batteries 1, a central part 76a of one of which connector plates 76 is disposed to substantially close one of the center side apertures 35 made in the battery fixing plate 20, while the apertures 35 communicate with the clearances between the respective batteries 1, and the non-ventilative space can be readily formed by closing one of the apertures 35 so as to shield the clearance communicating with this aperture 35. In the case of this embodiment, the non-ventilative space is formed in one of the clearances between the respective batteries 1, that is, the space is one clearance surrounded by the batteries, so that the ventilation is further difficult, and the temperature of batteries 1 can be further accurately detected.

What is claimed is:

1. A charger comprising a battery pack, and a charger section;

said battery pack including a housing containing a plurality of batteries, having a contacting terminal means disposed on an outer periphery of the pack, vent ports formed in a wall of the housing which said charger section engages, and a temperature sensing means disposed in the housing for detecting a battery temperature; and said charger section having a charging terminal means engaging the contacting terminal means, means for charging the batteries in the battery pack through the contacting and charging terminal means, blast ports being aligned with the vent ports of the battery pack, and a blower for blowing air towards and into the blast ports to blast ventilation airflow through the blast and vent ports into the interior of the battery pack;

a portion of the interior of the battery pack housing being isolated from the ventilation airflow to define a non-ventilated space, and wherein the temperature sensing means is disposed in the non-ventilated space.

2. The charger according to claim 1 wherein the temperature sensing means is enclosed in a cushion member.

3. The charger according to claim 2 wherein the cushion member is attached to one of the batteries.

4. The charger according to claim 2 wherein the cushion member isolates the temperature sensing means from the ventilation airflow.

5. The charger according to claim 4 wherein the non-ventilation space is formed by a clearance between adjacent batteries.

6. The charger according to claim 1 wherein the non-ventilated space is isolated from the airflow by one of a plurality of connecting plates disposed between electrodes of adjacent pairs of the batteries, the one connecting plate closing a clearance formed between the respective adjacent pair of batteries.

7. The charger according to claim 1 wherein the battery pack is movable from the charge section, the vent ports of the battery pack coinciding with the blast ports of the charger section when the battery pack is mounted to the charger section.

* * * * *